(12) United States Patent
Morterol

(10) Patent No.: US 6,649,710 B2
(45) Date of Patent: Nov. 18, 2003

(54) GAS PHASE POLYMERIZATION PROCESS

(75) Inventor: Frederic Robert Marie Michel Morterol, Sausset-les-Pins (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 10/132,275

(22) Filed: Apr. 26, 2002

(65) Prior Publication Data

US 2003/0018142 A1 Jan. 23, 2003

Related U.S. Application Data

(63) Continuation of application No. PCT/GB00/04102, filed on Oct. 24, 2000.

(30) Foreign Application Priority Data

Oct. 29, 1999 (FR) .............................................. 99 14188

(51) Int. Cl.⁷ ................................ C08F 2/00; C08F 2/34
(52) U.S. Cl. .......................... 526/88; 526/106; 526/901
(58) Field of Search ............................ 526/88, 901, 106

(56) References Cited

U.S. PATENT DOCUMENTS

| 4,469,853 A | | 9/1984 | Mori |
| 4,748,221 A | * | 5/1988 | Collomb et al. ............. 526/153 |
| 5,534,607 A | * | 7/1996 | Martens et al. ................ 526/88 |
| 5,627,242 A | | 5/1997 | Jacobsen et al. |

FOREIGN PATENT DOCUMENTS

| EP | 0 475 603 A1 | 3/1992 |
| EP | 0 476 835 A1 | 3/1992 |
| FR | 2 680 794 | 3/1993 |
| WO | WO 94/03509 | 2/1994 |

* cited by examiner

*Primary Examiner*—Fred Teskin
(74) *Attorney, Agent, or Firm*—Finnegan, Henderson, Farabow, Garrett and Dunner, L.L.P.

(57) ABSTRACT

A process for preventing polymeragglomeration and for controlling the density of copolymer produced by an alpha-olefin copolymerization process in a polymerization reactor, wherein the ratio of the flow rates of introduction of the comonomer(s) to the monomer is kept constant.

13 Claims, 2 Drawing Sheets

GAS PHASE POLYMERIZATION PROCESS

CROSS REFERENCE TO RELATED APPLICATIONS

This application is a continuation of international application number PCT/GB00/04102, filed Oct. 24, 2000, the content of which is incorporated herein by reference and claims the priority of French Patent Application No. 9914188, filed on October 29, 1999.

BACKGROUND OF THE INVENTION

The present invention relates to a process for preventing polymer agglomeration and for controlling the density of copolymer produced by an alpha-olefin copolymerization process in a polymerization reactor, wherein the ratio of the flow rates of introduction of the comonomer(s) to the monomer is kept constant.

It is well known to copolymerize olefins, for example ethylene, propylene, butene, hexene and octene, continuously, for example in the gas phase in a fluidized-bed or mechanically stirred reactor in the presence of a polymerization catalyst, for example a Ziegler-Natta-type catalyst, a metallocene, a chromium catalyst, an iron or cobalt catalyst.

Numerous methods have already been described in the literature in relation to controlling the polymerization reaction. When carrying out the copolymerization of alpha-olefins in a polymerization reactor in the presence of a metallocene catalyst, the Applicant was unable, using known methods, to simultaneously control effectively the density of the copolymer produced and to prevent polymer agglomeration, as borne out by the comparative example described hereinbelow.

SUMMARY OF THE INVENTION

Unexpectedly, the Applicant has found that the density of a copolymer produced by continuous gas phase polymerization in the presence of a metallocene catalyst can be effectively controlled and that polymer agglomeration can be effectively prevented by keeping constant the ratio of the flow rates of introduction of the comonomer(s) to the monomer.

BRIEF DESCRIPTION OF THE DRAWINGS

Of the drawing:

FIG. 2 is a graph showing the change in density of a copolymer produced according to a comparative process.

DETAILED DESCRIPTION OF THE INVENTION

Figure 1A:
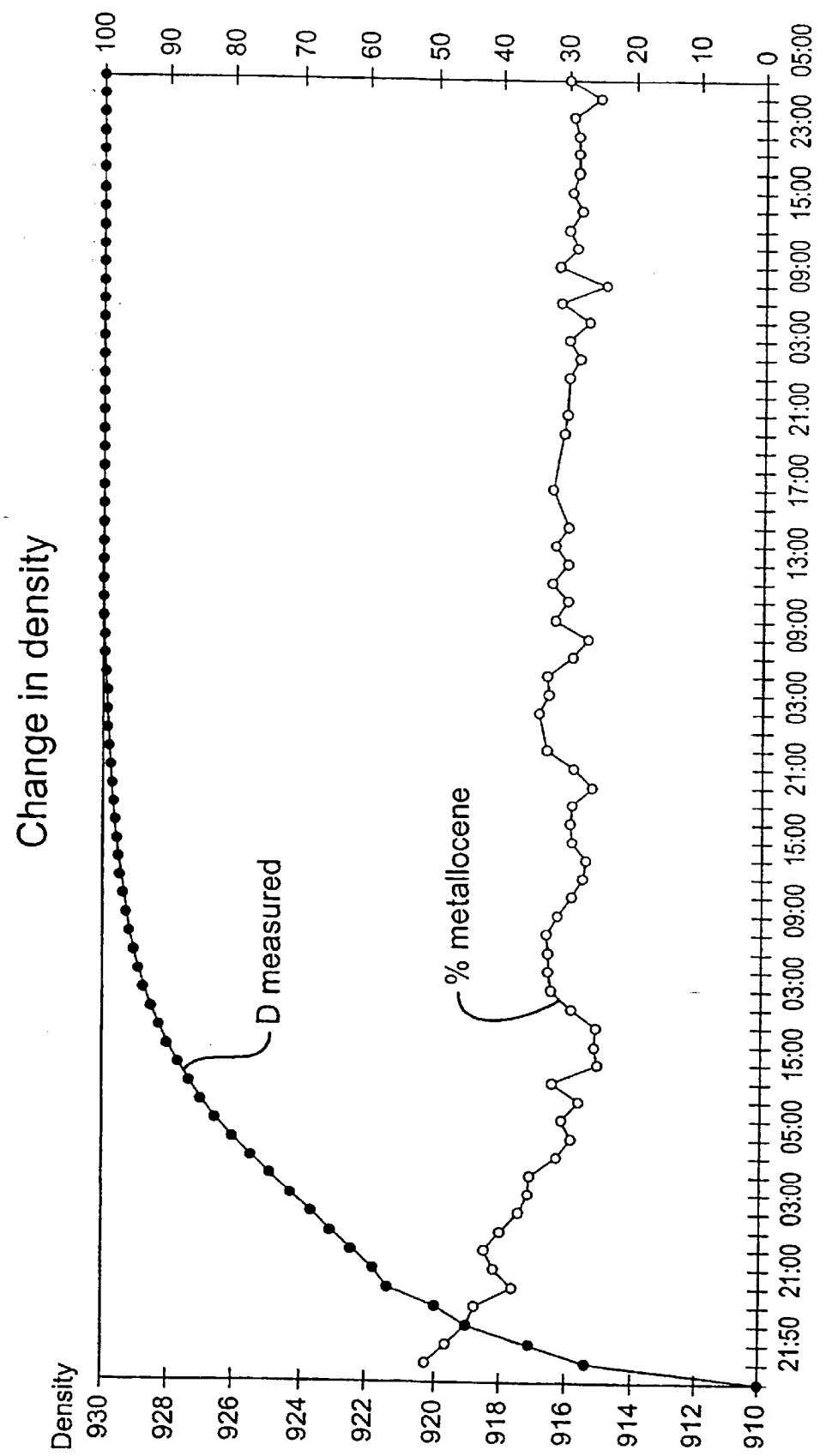
FIG. 1 is a graph showing the change in density of a copolymer produced according to the process of the invention.

The present invention therefore provides a process for preventing polymer agglomeration and for controlling the density of copolymer produced by a continuous process for copolymerizing alpha-olefins having 2 to 6 carbon atoms in a polymerization reactor in the gas phase in the presence of a metallocene-type catalyst, characterized in that the ratio of the flow rates of introduction of the comonomer(s) to the monomer is kept constant.

This characteristic may be represented by the formula $$(qCi/qM) = K$$

where $qCi$ is the flow rate of introduction of the comonomer i into the reactor, $qM$ is the flow rate of introduction of the monomer into the reactor and $K$ is therefore a constant. When the individual (co)monomer flow rates are expressed in weight flow rates (e.g. kg/h), $K$ is preferably comprised between 0.005 and 1; when ethylene is the main monomer, $K$ is preferably comprised between 0.005 and 0.333333, more preferably between 0.01 and 0.2.

As interpreted in the sense of the present invention, monomer M is the olefin with the highest molar concentration in the polymer; by deduction, the comonomer Ci is any olefin whose molar concentration in the polymer is less than that of the monomer M.

In accordance with the present invention, a constant ratio is a ratio which varies by not more than 10%, preferably not more than 5%, more preferably not more than 2%, under standard operating conditions.

The primary advantage of the continuous process of the present invention is that it makes it possible not only to obtain copolymers having a property of constant density over time but also to control the copolymerization more simply and effectively than in the past. An unexpected secondary advantage of the continuous process of the present invention is that detrimental agglomeration is effectively prevented as disclosed in the example.

The composition of the gaseous reaction mixture which passes through the copolymerization reactor, preferably the fluidized-bed reactor, therefore comprises at least two olefins which may have, for example, 2 to 6 carbon atoms, such as ethylene, propylene, 1-butene, 1-hexene and 4-methyl-1-pentene. Preferably, the monomer is ethylene or propylene and the comonomer is ethylene, propylene, 1-butene, 1-hexene or 4-methyl-1-pentene. More preferably, the monomer is ethylene and the comonomer is 1-butene, 1-hexene or 4-methyl-1-pentene, preferably 1-hexene.

The gaseous reaction mixture may also comprise an inert gas such as nitrogen and/or a saturated hydrocarbon such as ethane, propane, butane, pentane or hexane, and/or hydrogen.

The polymerization is advantageously carried out continuously in a fluidized-bed reactor in accordance with techniques which are known per se and in apparatus such as those described in French Patents 2 207 145 and 2 335 526 or European Patent EP-0 855 411. The gaseous reaction mixture comprising the alpha-olefins to be polymerized is generally cooled by means of at least one heat exchanger arranged on the outside of the reactor, before being recycled with the aid of a recycling conduit. The process of the invention is particularly suitable for very large industrial reactors; in accordance with one embodiment of the present invention, the reactor used makes it possible to produce quantities of copolymer of more than 300 kg/h, preferably more than 10,000 kg/h. The process of the invention is further particularly suitable for high production rates (i.e. the space time yield in terms of weight of polymer produced per unit volume of reactor space per unit time) in commercial gas fluidised bed reactors; consequently, according to a further embodiment of the present invention, space time yields are higher than 25 kg/m$^3$/h, preferably higher than 50 kg/m$^3$/h, more preferably higher than 80 kg/m$^3$/h.

In accordance with one preferred embodiment of the present invention, the polymerization reactor is also fed with the catalyst with a constant catalyst flow rate, which also makes it easier to control the activity of the polymerization reaction. In fact, such conditions lead, unexpectedly, to the production of copolymer having constant physicochemical characteristics, which is crucial for an industrial process.

Astonishingly, the Applicant has found that the continuous control process which it developed for gas phase metallocene catalysis may also be extended to other polymerization catalysts and to other types of polymerization processes (for example, in suspension).

When chromium oxide or metallocene-type polymerization catalysts are used, the Applicant has further found that its process was more effective when the said copolymerization process meets certain essential conditions. In effect, in copolymerization situations for which the ratio of the molar concentrations of the comonomers to the monomer in the copolymer is greater than the ratio of the partial pressures of the comonomers to the monomer, then the control of the density in accordance with the present invention may be utilized advantageously when chromium oxide or metallocene-type polymerization catalysts are used.

This condition may be represented by the formula $$([Ci]/[M])>(pCi/pM)$$

where [Ci] is the molar concentration of the comonomer i in the polymer, [M] is the molar concentration of the monomer M in the polymer, pCi is the partial pressure of the comonomer i and pM is the partial pressure of the monomer M.

The present invention therefore likewise provides a process for preventing polymer agglomeration and for controlling the density of copolymer produced by a continuous process for copolymerizing alpha-olefins having 2 to 6 carbon atoms in a polymerization reactor in the presence of a chromium oxide polymerization catalyst or a metallocene-type polymerization catalyst, characterized in that the ratio of the molar concentrations of the comonomer(s) to the monomer in the copolymer produced is greater than the ratio of the partial pressures of the comonomer(s) to the monomer and in that the ratio of the flow rates of introduction of comonomer(s) to the monomer is kept constant, namely in that ([Ci]/[M])>(pCi/pM) and (qCi/qM)=K.

In accordance with one preferred embodiment of the present invention, the polymerization reaction is carried out in the gas phase, preferably in a fluidized-bed reactor.

The monomers and comonomer(s) are preferably selected from olefins having 2 to 12 carbon atoms such as ethylene, propylene, 1-butene, 1-hexene and 4-methyl-1-pentene.

According to a further embodiment of the present invention, there is also claimed the use of a control by constant flow ratio of comonomer(s) to monomer, namely that (qCi/qM)=K, during a continuous process for copolymerizing alpha-olefins having 2 to 12 carbon atoms in a gas phase polymerization reactor in the presence of a metallocene-type polymerization catalyst in order to prevent polymer agglomeration and to control the polymer density.

According to another further embodiment of the present invention, there is also claimed the use of a control by constant flow ratio of comonomer(s) to monomer, namely that (qCi/qM)=K, during a continuous process for copolymerizing alpha-olefins having 2 to 12 carbon atoms in a polymerization reactor in the presence of a chromium oxide polymerization catalyst or a metallocene-type polymerization catalyst wherein the ratio of the molar concentrations of the comonomer(s) to the monomer in the copolymer produced is greater than the ratio of the partial pressures of the comonomer(s), namely that ([Ci]/[M])>(pCi/pM), in order to prevent polymer agglomeration and to control the polymer density.

In respect of the above control uses, the composition of the gaseous reaction mixture which passes through the copolymerization reactor, preferably the fluidized-bed reactor, comprises at least two olefins which may have, for example, 2 to 12 carbon atoms, such as ethylene, propylene, 1-butene, 1-hexene, 4-methyl-1-pentene and 1-octene. Preferably, the monomer is ethylene or propylene and the comonomer is ethylene, propylene, 1-butene, 1-hexene, 4-methyl-1-pentene or 1-octene. More preferably, the monomer is ethylene and the comonomer is 1-butene, 1-hexene or 4-methyl-1-pentene, preferably 1-hexene.

In accordance with the preferred process of the present invention, the total pressure of the gaseous reaction mixture in the gas phase polymerization reactor is commonly between 0.5 and 5 MPa, preferably between 1.5 and 2.5 MPa; it may vary freely, preferably with maximum variations of less than 0.3 MPa and, in the majority of cases, of the order of 0.1 MPa. In fact, it is obvious that for safety reasons the pressure of the gaseous reaction mixture will not be permitted to exceed a predetermined maximum pressure, which depends generally on the reactor used. Therefore, it will be possible to reduce the (co)monomer flow rates (preferably while keeping constant the ratio of the flow rates, in accordance with the present invention) and/or to increase the flow rate of injection of catalyst in the case where the pressure of the-gaseous reaction mixture reaches the maximum pressure.

It is likewise obvious that the pressure of the gaseous reaction mixture must be kept above a predetermined minimum pressure in order to permit minimum and adequate removal of the heat of polymerization. In a fluidized-bed reactor, this minimum pressure must likewise permit effective fluidization of the polymer particles forming the bed. An inert gas having a good heat exchange capacity may advantageously be used in order to attain this minimum pressure. In accordance with the process of the present invention, the partial pressure of the alpha-olefins may also vary freely.

The copolymerization may therefore be carried out, for example, in the presence of a catalyst of Ziegler-Natta type comprising at least one transition metal in combination with a cocatalyst comprising an organometallic compound, for example an organoaluminium compound. The catalyst essentially comprises an atom of a transition metal selected from the metals of groups IV to VI of the periodic classification of the elements, such as titanium, vanadium, chromium, zirconium or hafnium, optionally a magnesium atom and a halogen atom. The catalyst may be supported on a porous refractory oxide such as silica or alumina or may be combined with a solid magnesium compound, such as the chloride, the oxide, the hydroxy chloride or an alcoholate of magnesium. By way of example, mention may be made of the catalysts described in the patents U.S. Pat. No. 4,260, 709, EP 0 598 094, EP 0 099 774 and EP 0 175 532. The present invention is also particularly appropriate for silica-supported Ziegler catalysts, for example those described in Patents WO 93/09147, WO 95/13873, WO 95/34380 and WO 99/05187. The catalyst can be used as it is or optionally in the form of a coated catalyst or prepolymer containing, for example, from 10-5 to 3, preferably from 10-3 to 10-1, millimoles of transition metal per gram of polymer; it can be used together with a cocatalyst or activator, e.g. an organometallic compound of a metal from groups I to III of the Periodic Classification of the Elements, such as, for example, an organoaluminum compound. It is also possible to use a catalyst complexed by a metal selected from those of group VIII of the periodic classification of the elements, such as, for example, nickel, iron or cobalt. By way of examples, mention may be made of those described in Patent Application WO 98/27124 or WO 98/2638. It is also possible to use catalysts based on platinum or palladium as the transition metal; complexes of this type are described, for example, in the Patent WO 96/23010.

The copolymerization may thus also be carried out in the presence of a chromium oxide catalyst. Examples of chromium oxide catalysts are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula $CrO_3$, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminium or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the heat treatment is generally between 250° C. and 1200° C. and preferably between 350 and 1000° C. Such catalyst preferably contains from 0.05 to 5%, more preferably from 0.1 to 2%, by weight of chromium; it can contain, in addition to the chromium, from 0.1 to 10% of titanium in the form of titanium oxide and/or fluorine and/or aluminium, in particular in the form of aluminium oxide; it can be used as it is or optionally in the form of a coated catalyst or prepolymer containing, for example, from 10-5 to 3, preferably from 10-3 to 10-1, millimoles of chromium per gram of polymer. The chromium oxide catalysts may be used together with a cocatalyst or activator, e.g. an organo-metallic compound of a metal from groups 1 to III of the Periodic Classification of the Elements, such as, for example, an organoaluminum compound. Examples of catalysts can be found, for example, in EP275675, EP453116, or WO9912978.

In accordance with the preferred embodiment of the present invention, the copolymerization catalyst is a metallocene-type catalyst.

Mention may be made, by way of example, of those corresponding to the formula

[L]mM[A]n where L is a bulky ligand; A is a leaving group, M is a transition metal and m and n are such that the total valency of the ligand corresponds to the valency of the transition metal.

The ligands L and A may be bridged. L is generally a ligand of the cyclopentadienyl type.

Examples of metallocene catalysts of this type are described in U.S. Pat. Nos. 4,530,914, 5,124,418, 4,808,561, 4,897,455, 5,278,264, 5,278,119, 5,304,614, and EP-A-0 129 368, EP-A-0 591 756, EP-A-0 520 732, EP-A-0 420 436, WO 91/04257, WO 92/00333, WO 93/08221, WO 93/08199.

It is also possible to use with advantage the metallocene-based catalyst systems as described in U.S. Pat. Nos. 4,871,705, 4,937,299, 5,324,800, 5,017,714, 5,120,867, 4,665,208, 4,952,540, 5,091,352, 5,206,199, 5,204,419, 4,874,734, 5 4,924,018, 4,908,463, 4,968,827, 5,308,815, 5,329,032, 5,248,801, 5,235,081, 5,157,137, 5,103,031 and EP-A-0 561 476, EP-BI-0 279 586, EP-A-0 594 218 and WO 94/10180. Mention may also be made of the Patents WO 92/00333, WO 94/07928, WO 91/04257, WO 94/03506, U.S. Nos. 5,057,475, 5,096,867, 5,055,438, 5,198,401, 5,227,440, 5,264,405, EP-A-0 420 436, U.S. Nos. 5,604,802, 5,149, 819, 5,243,001, 5,239,022, 5,276,208, 5,296,434, 5,321,106, 5,329,031, 5,304,614, WO 93/08221, WO 93/08199 and EP-A-0 578 838. The preferred transition metal compounds of the catalyst are those of group 4, in particular zirconium, titanium and hafnium. The metallocene catalyst used in the present invention may also be represented by the general formula (Cp)m MRnR'p, where Cp is a ring of the cyclopentadienyl type, M is a transition metal of group 4, 5 or 6; R and R' may be selected from halogens and hydrocarbyl or hydrocarboxyl groups; m=1-3, n=0-3, p=0-3 and the sum m+n+p equals the oxidation state of M; preferably, m=2, n=1 and p=1.

The metallocene catalyst used in the present invention may be also represented by the general formula (C5 R'm)p R"s (C5 R'm) Me Q3-p-x, or R"s (C5 R'm)2 MeQ' where Me is a transition metal of group 4, S or 6, at least one CS R'm is a substituted cyclopentadienyl, each R', which may be identical or different, is hydrogen, an alkyl, alkenyl, aryl, alkylaryl or arylalkyl radical having 1 to 20 carbon atoms, or two carbon atoms linked together to form part of a substituted or unsubstituted ring having 4 to 20 carbon atoms, R" is a radical containing one or more or a combination of carbon, germanium, silicon, phosphorus or nitrogen atoms which bridges two rings (C5 R'm), or which bridges one ring (C5 R'm) to M, when p=0, x=1, else "x" is always 0, each Q, which may be identical or different, is an alkyl, alkenyl, aryl, alkylaryl or arylalkyl radical having 1 to 20 carbon atoms, a halogen or an alkoxide, Q' is an alkylidene radical having 1 to 20 carbon atoms, s is 0 or 1, and when s is 0, m is S and p is 0, 1 or 2 and when s is 1, m is 4 and p is 1.

The metallocene catalysts are generally used with an activator or cocatalyst. Examples which may be mentioned include alumoxane and/or ionic or neutral ionizing activators, or compounds such as pentafluorophenyl tri(n-butyl)ammonium tetraborate or the boric metalloid precursor of trisperfluorophenyl, which ionizes the neutral metallocene compound. Compounds of this type are described in EP-A-0 570 982, EP-A-0 520 732, EP-A-0 495 375, EP-A-0 426 637, EP-A-500 944, EP-A-0 277 003 and EP-A-0 277 004 and U.S. Pat. Nos. 5,153,157, 5,198,401, 5,066,741, 5,206,197 and 5,241,025, WO 94/07928.

Catalyst combinations may also be used, for example those described in U.S. Pat. Nos. 5,281,679, 4,701,432, 5,124,418, 5,077,255 and 5,183,867.

Other examples of metallocene catalysts are described in Patents U.S. Pat. No. 5,317,036, EP-A-0 593 083, U.S. Pat. Nos. 4,937,217, 4,912,075, 4,935,397, 4,937,301, 4,914, 253, 5,008,228, 5,086,025, 5,147,949, 4,808,561, 4,897,455, 4,701,432, 5,238,892, 5,240,894, 5,332,706, WO 95/10542, WO 95/07939, WO 94/26793 and WO 95/12622.

Preferably, the metallocene comprises
A) an inert support,
B) a group 4–10 metal complex corresponding to the formula:

where M is a metal of one of groups 4 to 10 of the Periodic Table of the Elements, Cp is an anionic ligand group, Z is a divalent moiety linked to Cp and linked to M, comprising boron or an element of group 14 of the Periodic Table of the Elements, and further comprising nitrogen, phosphorus, sulphur or oxygen;

X is a neutral conjugated diene ligand group having up to 60 atoms, or a dianionic derivative, and C) an ionic cocatalyst capable of converting the metal complex into an active polymerization catalyst.

Examples of cocatalysts are described in U.S. Pat. Nos. 5,132,380, 5,153,157, 5,064,802, 5,321,106, 5,721,185 and 5,350,723. Mention may also be made of the complexes described in WO 96/28480 and WO 98127119.

The catalyst may be used in the form of a prepolymer prepared beforehand during a prepolymerization step from catalysts described above. The prepolymerization may be carried out by any process, for example a prepolymerization in a liquid hydrocarbon or in gas phase in accordance with a batchwise, semicontinuous or continuous process.

The catalyst or the prepolymer may be introduced into the reactor continuously or discontinuously.

The person skilled in the art has at their disposition various techniques making it possible to determine the concentration of comonomer in the end polymer. By way of example, mention may be made of the methods of nuclear magnetic resonance and infrared spectroscopy.

The method used in the context of the examples described below is that of infrared spectroscopy.

The comonomer content measurements were obtained by measuring the intensity of the infrared absorption bands obtained by transmission through compressed films with a thickness ranging from 200 to 250 $\mu$m.

Standardization was carried out using polymers characterized by NMR spectroscopy. Following baseline correction, the comonomer contents were derived from the ratios of the various absorption bands as follows:

| 1-butene | A772/A4320 |
| 1-hexene | A1377/A1368 |
| 4-methyl-1-pentene | A920/A4320, |

Ay corresponding to the absorbance observed for a wave number of y cm$^{-1}$.

For the measurement of 1-hexene, the absorbance at 1.377 cm$^{-1}$ comprises the contributions of all the methyl groups, including those situated on the n-butyl branches and on the chain ends. A correction was therefore applied to the raw data in order to take account of the n-butyl branches and thus of the quantity of 1-hexene in the polymer. This correction is based on the value of the number-average molecular weight, Mn, taking account of the fact that the polymer contains 2 terminal methyl groups.

The examples which follow illustrate the present invention.

EXAMPLE 1

Operations are conducted in a conventional fluidized-bed reactor consisting of a vertical cylinder with a diameter of 5 m and a height of 18.5 m. This reactor was purified beforehand so as to reduce the poison content in the gaseous reaction mixture employed, in accordance with the method described in Example 1 of European Patent Application EP-A-1 80 420.

The reaction initially contains a fluidized bed with a height of 10 m, consisting of a polymer originating from a previous reaction and having a density of 0.92, a melt index MFI2.16, measured under 2.16 kg at a temperature of 190° C., of 2.4 g per 10 minutes, a molecular mass distribution of 3.7, a titanium content of 5 ppm and a 1-butene content of 9%.

Initially, the gaseous reaction mixture passing through the fluidized bed contains by volume 60% nitrogen, 60% ethylene, 0.27% 1-hexene and 0.15% hydrogen. The initial total pressure of this mixture is 2 MPa and the flow rate is 52 cm/s. The temperature of the polymerization reaction is then 75° C.

Use is made of a catalyst system as indicated in Example 1 of the patent application whose application number is GB 9910370.7 (or PCT/GB 00/01611 dated Apr. 26, 2000).

Five hours after startup of the reaction, the total pressure is 2 MPa, the flow rate is still 52 cm/s and the height of the fluidized bed is 12 m. Furthermore, the reaction temperature is 75° C. and the titanium content in the polymer produced is 3 ppm. At this point in time, the flow rate of introduction of ethylene is 0.5 ton/hr; the system regulating the flow rates of introduction of ethylene and 1-hexene is regulated such that the ratio of these weight flow rates (qC6/qC2) is constant; in the present case, this ratio is 0.1.

Subsequently, every hour, the ethylene flow rate is increased by 500 kg/h; the flow rate of 1-hexene is increased simultaneously in order to maintain the ratio of the flow rates of introduction at the value of 0.1. In parallel, the catalyst flow rate is increased by 50 g/h. After 30 hours, the final total pressure is 2.4 MPa, the reaction temperature is 75° C., the flow rate is 55 cm/s and the height of the fluidized bed is 19 m.

At a rate of 16.5 tons/hour, a polymer is drawn off which has the characteristics of the target polymer powder. This production rate is therefore held constant. A product of polymer withdrawn which exhibits a remarkable persistency of quality may be observed, in particular the density, as borne out by FIG. 1A. Moreover, the operations were not disrupted by any formation of agglomerates or fine particles. The weight percentage of 1-hexene in the copolymer is 8%, the density of the copolymer is 0.916 and the flow index MFI2.16 measured under 2.16 kg at a temperature of 190° C. is 1.3 g per 10 minutes.

COMPARATIVE EXAMPLE

Operations are conducted in a fluidized-bed reactor identical with that of the preceding example and purified beforehand in a similar fashion and under identical conditions, namely:

initial bed height 10 m bed of polymer originating from a previous reaction and having a density of 0.92, a flow index MF12.16, measured under 2.16 kg at a temperature of 190° C., of 2.4 g per 10 minutes, a molecular mass distribution of 3.7, a titanium content of 5 ppm and a 1-butene content of 9%.

identical catalyst identical gaseous reaction mixture initial total pressure of 2 MPa fluidization rate of 52 cm/s polymerization temperature of 75° C.

Figure 1B:
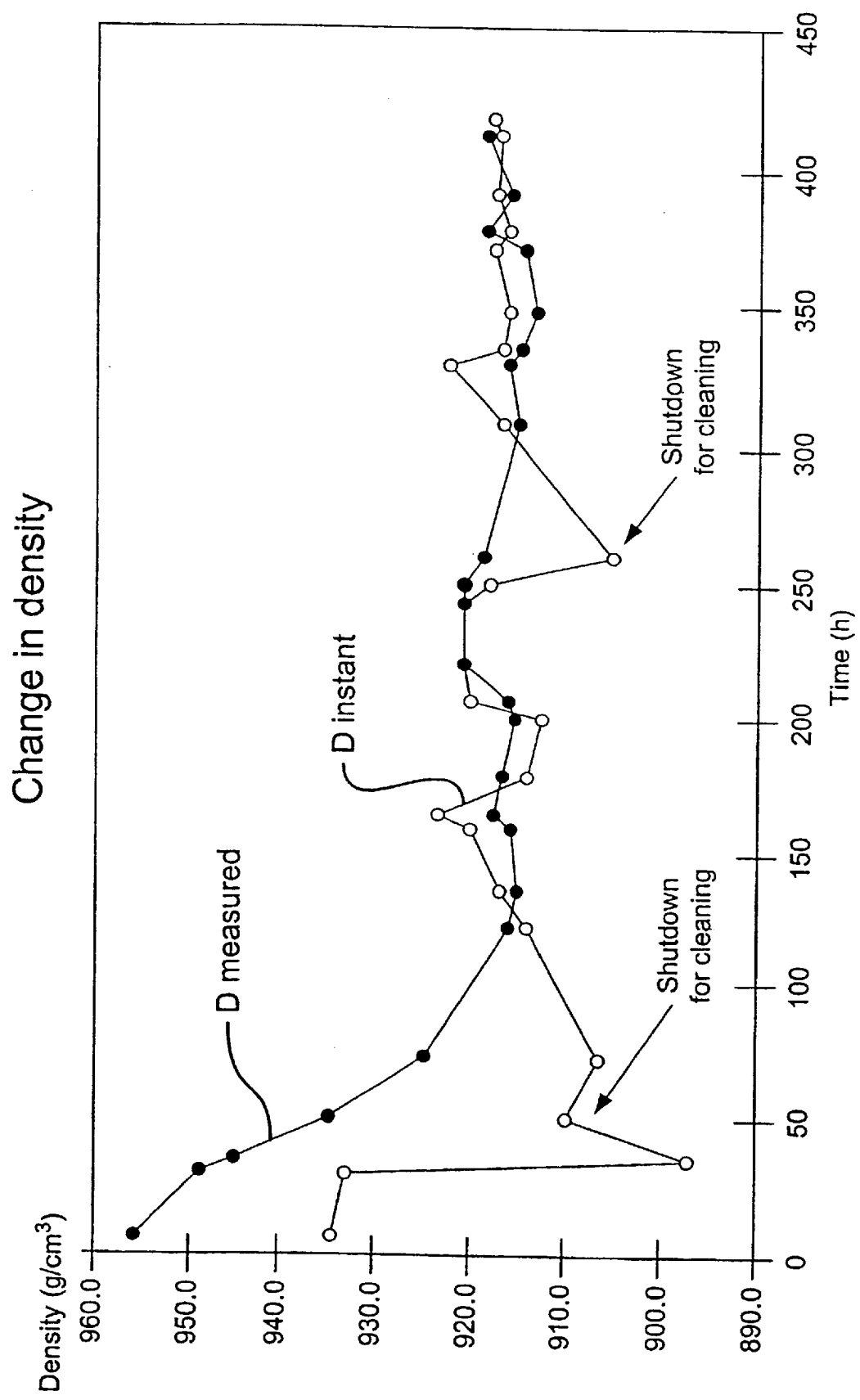

Five hours after startup of the reaction, the total pressure is 2 MPa, the fluidization rate is still 52 cm/s and the height of the fluidized bed is 12 m. Moreover, the reaction temperature is 75° C. and the titanium content in the polymer produced is 3 ppm. At this point in time, the flow rate of introduction of ethylene is 0.5 ton/hr. Then, every hour, the catalyst flow rate is increased by 50 g/h. In parallel, the ethylene flow rate increases by 500 kg/h. At this stage, the flow rate of introduction of 1-hexene is not regulated; in contrast, the approach is taken of maintaining an identical gas composition by carrying out a control by keeping constant the ratio of the partial pressures of comonomer to the monomer. Under these conditions, in a first stage a copolymer is obtained whose density is significantly less than the target value (0.916), as borne out by the FIG. 1B, there are agglomerates of very low density (<0.912) which appear. It is therefore necessary to reduce production to 10 tons/hour and to modify the 1-hexene flow rate manually in order to maintain the density at a more or less correct value, without ever achieving the degree of density control obtained by virtue of the process of the present invention. In deed, shutdowns had to be carried out in order to clean the reactor.

What is claimed is:

1. A process for preventing polymer agglomeration and for controlling the density of a copolymer produced by a continuous copolymerization process comprising copolymerizing in a continuous polymerization reaction a monomer and at least one comonomer in a polymerization reactor in the presence of a polymerization catalyst, said monomer and said at least one comonomer being alpha-olefins having from 2 to 6 carbon atoms, wherein the ratio of the flow rates of introduction into the polymerization reaction of said at least one comonomer to the monomer is kept constant.

2. Process according to claim 1 wherein the alpha-olefins are selected from the group consisting of ethylene, propylene, 1-butene, 1-hexene and 4-methyl-1-pentene.

3. Process according to claim 2 wherein the monomer is ethylene or propylene and the comonomer is ethylene, propylene, 1-butene, 1-hexene or 4-methyl-1-pentene.

4. Process according to claim 3 wherein the monomer is ethylene and the comonomer is 1-butene, 1-hexene or 4-methyl-1-pentene.

5. Process according to claim 4 wherein the comonomer is 1-hexene.

6. Process according to claim 1 wherein the continuous polymerization reaction is carried out in a gas phase polymerization reactor.

7. Process according to claim 6 wherein the continuous gas phase polymerization reaction is carried out in a fluidized-bed reactor.

8. Process according to claim 1 wherein the continuous polymerization reaction is carried out in the presence of a catalyst system comprising a Ziegler-Natta catalyst or a chromium oxide catalyst or a metallocene catalyst.

9. Process according to claim 8 wherein the continuous polymerization reaction is carried out in the presence of a catalyst system comprising a chromium oxide catalyst or a metallocene catalyst.

10. Process according to claim 9, wherein the ratio of the molar concentrations of the at least one comonomer to the monomer in the copolymer produced is greater than the ratio of the partial pressures of the at least one comonomer to the monomer.

11. Process according to claim 9 wherein the continuous polymerization reaction is carried out in the presence of a catalyst system comprising a metallocene catalyst.

12. Process according to claim 1 wherein more than one alpha-olefin comonomer having from 2 to 6 carbon atoms is reacted with the monomer and the ratio of the flow rates of introduction into the polymerization reaction of said comonomers to the monomer is kept constant.

13. Process according to claim 1, wherein the constant flow ratio is represented by the formula $$(qCi/qM)=K$$

where qCi is the weight flow rate of introduction of the at least one comonomer i into the polymerization reactor and qM the weight flow rate of introduction of the monomer M into the polymerization reactor and K is a constant between 0.005 and 1.

* * * * *